United States Patent [19]

Layher

[11] 4,044,523
[45] Aug. 30, 1977

[54] FRAME STRUCTURE, PARTICULARLY SCAFFOLDING

[76] Inventor: Eberhard Layher, D7129 Eibensbach, Kreis Heilbronn, Germany

[21] Appl. No.: 621,660

[22] Filed: Oct. 14, 1975

[30] Foreign Application Priority Data

Oct. 16, 1974 Germany .............................. 2449124

[51] Int. Cl.[2] .......................... E04G 7/00; F16B 7/00
[52] U.S. Cl. ..................................... 52/638; 182/179; 403/49; 403/256
[58] Field of Search ................. 52/632, 637, 638, 645, 52/646; 182/178, 179; 403/49, 108, 109, 187, 189, 174, 175, 242, 284, 378, 379, 256; 211/182; 248/354 R, 354 P

[56] References Cited

U.S. PATENT DOCUMENTS

| 1,460,928 | 7/1923 | Tilden | 182/179 |
| 2,303,428 | 12/1942 | Black | 52/645 |
| 3,420,557 | 1/1969 | Francis | 182/179 |
| 3,432,916 | 3/1969 | Fisher | 403/284 |
| 3,817,641 | 6/1974 | Steele et al. | 403/256 |

FOREIGN PATENT DOCUMENTS

| 1,278,243 | 6/1972 | United Kingdom | 403/49 |
| 435,761 | 9/1935 | United Kingdom | 182/179 |

*Primary Examiner*—J. Karl Bell
*Attorney, Agent, or Firm*—Michael J. Striker

[57] ABSTRACT

The frame structure of the invention has a plurality of tubular uprights of circular cross-section each including a number of axially spaced ring flanges which are concentric with the respective upright and which are each formed with circumferentially distributed cut-outs of differing shapes. A plurality of bracing elements connect the respective uprights and each of them has two end portions. Each end portion is formed with an axial slot having a width at least equal to the thickness of the respective ring flanges and subdividing the respective end portion into two sections provided with registering openings extending normal to the elongation of the respective bracing element. A releasable wedge member extends through these openings across the slot and through one of the cut-outs of a ring flange which is in part located in the slot.

11 Claims, 7 Drawing Figures

FRAME STRUCTURE, PARTICULARLY SCAFFOLDING

BACKGROUND OF THE INVENTION

The present invention relates to a frame structure in general, and more particularly to a frame structure for use in the erection of buildings and the like, i.e. a scaffolding.

It is known to provide scaffolding wherein the upright elements and the bracing elements connecting them are tubular members of circular cross-section. However, it is also known to use, at least for the bracing elements, solid-cross-section members having various different types of profiling, for example U-shaped cross-section.

In the prior art, the individual elements of such scaffoldings are connected with one another by means of couplings, for example screw couplings or the like. Generally speaking, these prior art constructions are disadvantageous for various reasons. They take a considerable length of time for erection and disassembly, and must, as a rule, be erected by specialists, i.e., by skilled personnel. Because of the type of couplings used, the scaffolding is subjected to pressures which are not balanced, and therefore such scaffoldings are not as safe and reliable as is desired.

Various attempts have been made to overcome these difficulties of the prior art, but none of them has been found to be successful.

SUMMARY OF THE INVENTION

Accordingly, it is an object of the present invention to provide an improved frame structure of the type in question, particularly a frame structure suitable as a scaffolding, which avoids the aforementioned disadvantages.

Another object of the invention is to provide such a frame structure which can be assembled and disassembled in a most simple manner and in such a way that an unbalanced stressing of the scaffolding is avoided.

Another object of the invention is to provide such a frame structure which is highly reliable and safe.

Another object of the invention is to assure that the frame structure according to the present invention is so stressed, as a result of the manner in which the elements thereof are connected, that any welded connections, riveted or a screw connections that are present are largely free of stresses resulting from the connection itself.

Another object is to provide such a frame structure in which the bracing elements can be connected to the upright elements at any desired angle.

In keeping with these objects and others which will become apparent hereafter, one feature of the invention resides in a frame structure, particularly a scaffolding, comprising a plurality of tubular upright elements of circular cross-section, each including a number of axially spaced ring flanges which are concentric with the respective upright element and which are each formed with circumferentially distributed cut-outs of differing shapes. A plurality of bracing elements connect the respective upright elements and each of these has two end portions. Each of the end portions is formed with an axial slot which has a width at least equal to the thickness of the ring flanges and subdivides the respective end portion into two sections which are provided with registering openings extending normal to the elongation of the respective bracing element. A releasable wedge member extends through the respective openings of each end portion across the slot thereof and through one of the cut-outs of a ring flange which is in part located in this slot.

Each of the ring flanges may have at least four cut-outs which are circumferentially distributed and which have a substantially oval configuration and are so arranged that their major axes and their longitudinal planes of symmetry intersect at a right angle in the longitudinal axis of the respective upright element.

Between any two circumferentially spaced ones of these substantially oval cut-outs, there may be located an additional cut-out whose dimension in substantially radial direction relative to the ring flange corresponds to the corresponding dimension of the oval cut-out, whereas its width in substantially tangential direction of the ring flange is a multiple of the corresponding width of the oval cut-outs.

The frame structure of the present invention is assembled by inserting a portion of a respective ring flange into a slot at the end portion of one of the bracing elements, bringing the opening of the end portion into alignment with one of the cut-outs in the ring flange, and then inserting a wedge member through the aligned cut-out and openings so that the end portion of the bracing member is drawn against and firmly connected with the tubular upright on which the ring flange is provided. The openings in the end portions and also the cut-outs in the ring flanges are so arranged and dimensioned that the insertion of the wedge member causes the free end face of the respective end portion to be pulled against the outer surface of the tubular upright element. It is advantageous for this purpose if the free end faces of the end portions are curved in accommodation to the curvature of the outer circumferential surface of the tubular upright elements so that they can fully engage this surface in surface-to-surface contact therewith.

The best manner of establishing the connection between the upright elements and the bracing elements assures that the ring flanges are stressed only in radial direction by the connection via the wedge member, whereas the connection of the respective ring flanges to the upright element, which may be by means of welding, pressing or the like, is not subjected to stressing due to the connection. Thus, the connection between the upright element and the flange member need withstand only horizontal forces which are largely relieved due to the fact that the free end face of the bracing element is pressed against the outer circumferential surface of the upright element in frictional engagement therewith.

The slot and the openings for the wedge member may be formed directly in the end portions of the bracing elements, but the end portions can also be provided with separate inserts or shoes which are of solid cross-section rather than tubular cross-section.

The end portions of the diagonally extending bracing elements are advantageously formed with lugs, for example by pressing them together to a substantially flat configuration, on which a mounting shoe — constituting a part of the end portion — is secured so that it can turn about an axis extending normal to the longitudinal axis of the bracing element. This mounting shoe is then provided with the slot and the openings, mentioned above.

The larger-dimensioned cut-outs located between the substantially oval cut-outs in the flanges, i.e., the cutouts having a width which is a multiple of the width of the substantially oval cut-outs, make it possible to assemble the scaffolding and continue it at any desired angle, relative to its base outline. The ends of the horizontally or diagonally extending bracing elements are then connected via the wedge members and the openings with the larger-diameter cut-outs in the ring flanges, rather than with the substantially open cut-outs.

The construction of the scaffolding according to the present invention assures that the connections between the individual elements, i.e., the upright elements and bracing elements, are largely relieved of stresses. Also, the connections between the ring flanges and the upright elements are largely relieved of stresses, and are no longer subjected to tension since any tension forces which develop in the bracing elements are absorbed by the respective ring flanges and do not act upon the connection of the ring flanges to the upright elements.

Moreover, a scaffolding according to the present invention can be assembled in a very simple manner, since a mere insertion of the wedge member at the predetermined location is sufficient to establish a reliable and secure connection. The safety of the scaffolding is thereby increased and the erection of the scaffolding can be carried out by non-skilled personnel. The wedge connection by means of the wedge members offers, due to the pressing of the end faces of the bracing elements against the outer surfaces of the upright elements, a substantial relief of the connection between the ring flanges and the upright elements insofar as vertically acting stresses are concerned. The position of the wide cut-outs — as opposed to the substantially oval cutouts — in the wedge members makes it possible to erect a scaffolding which is not linear but wherein successive portions extend at different angles relative to one another. On the other hand, if successive portions are connected at right angles to one another, using the substantially oval cut-outs to establish the connection, the presence of the substantially oval cut-outs assures that the right-angular connection is precisely established and maintained. Moreover, if the ring flanges are connected to the upright elements by welding, the welding can be carried out by a simple automatic welding technique which further facilitates the construction of the upright elements.

The spacing of the ring flanges from one another in axial direction of the upright elements is advantageously so selected with reference to the height of the building stories to be erected, that the building story height is a whole multiple of the spacing between consecutive ones of the ring flanges. It is self-evident that when the ring flanges are connected to a respective upright element it must be assured that the respective substantially oval cut-out and the wider cut-outs in the superimposed ring flanges are in vertical registry with one another.

The wedge members are advantageously connected to the end portions of the bracing elements in such a manner that they can be far enough withdrawn from across the respective slot to permit the insertion and removal of the ring flange but cannot be lost, i.e., cannot be completely removed from the respective end portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1b is an axial section through FIG. 1a;

DESCRIPTION OF THE PREFERRED EMBODIMENTS

Figure 1B:
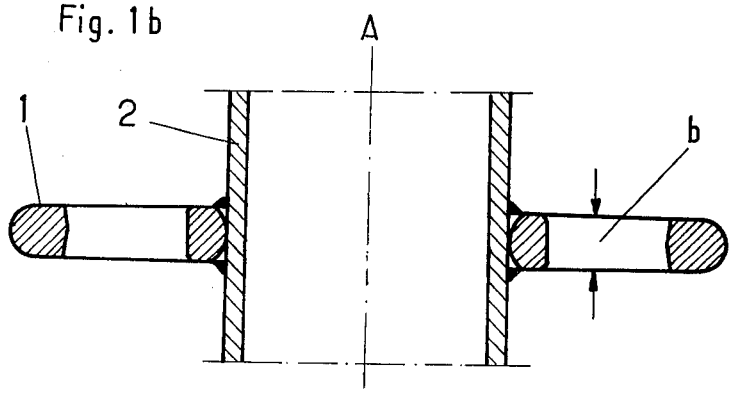
Figure 1A:
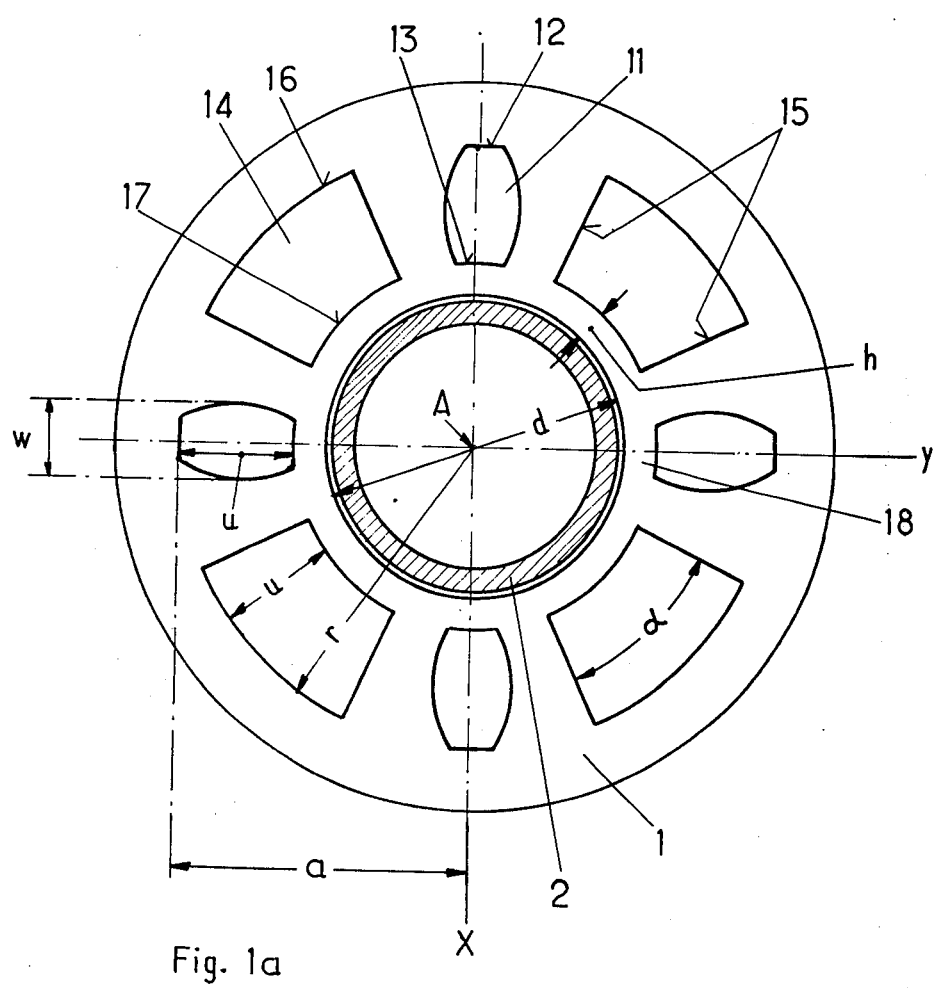
FIG. 1a is a cross-section through FIG. 1b, showing the ring flange of FIG. 1b in a top-plan view.

Discussing the drawing in detail it will be seen that FIG. 1a shows one of the ring-flanges 1 in a top-plan view. The inner diameter $d$ of the ring flange 1 is so selected that it can be connected with the upright element 2, which is tubular and of an appropriate metal, for example steel, in suitable manner, e.g., by welding or the like.

The ring flange 1 is provided with circumferentially spaced cut-outs 11 which are substantially oval in configuration and are so arranged that their longitudinal planes of symmetry, i.e., their major axes, $x$, and $y$, intersect one another in the longitudinal axis A of the respective upright element 2. The cut-outs 11 are provided with blunt ends bounded by planar faces 12 and 13, respectively. These faces 12 and 13 could also be arcuately curved on an arc whose center coincides with the longitudinal axis A of the respective upright element 2. The faces 12 and 13 can also be curved in axial direction of the respective ring flange 1, thus obtaining a particularly advantageous engagement with the wedge member 9 (compare FIG. 4a). The dimensions of the faces 12 and 13 in tangential direction correspond to the dimensions of the wedge member 9 to be inserted, so as to assure a proper seating of the free end of the respective bracing element against the respective vertical or upright element 2, thereby predetermining the orientation of the respective bracing elements in space.

Wider cut-outs 14 are provided in the flange 1 between respective circumferentially successive ones of the cut-outs 11. These wider cut-outs 14 are bounded by planar faces in the direction towards the respectively adjacent cut-outs 11 whereas their faces 16 and 17 which extend parallel to the circumference of the ring flange 1 are arcuately curved on radii coinciding with the longitudinal axis A of the upright element 2. The radius $r$ of the outer face 16, as measured from the longitudinal axis A, equals the spacing $a$ of the outer face 12 of the cut-out 11 from the axis A, i.e. corresponds to the radius of curvature of the outer face 11 measured from the axis A. The dimensions $u$ of the cut-outs 11 and 14 in substantially radial direction of the ring flange 1 are identical. Two planar boundary faces 15 of the wider cut-outs 14 extend radially so that lines extending them inwardly would also intersect one another in the longitudinal axis A at an angle $\alpha$ which is so large that the median width of the cut-outs 14 equals a multiple of the width w of the cut-outs 11 in the same direction.

Figure 2:
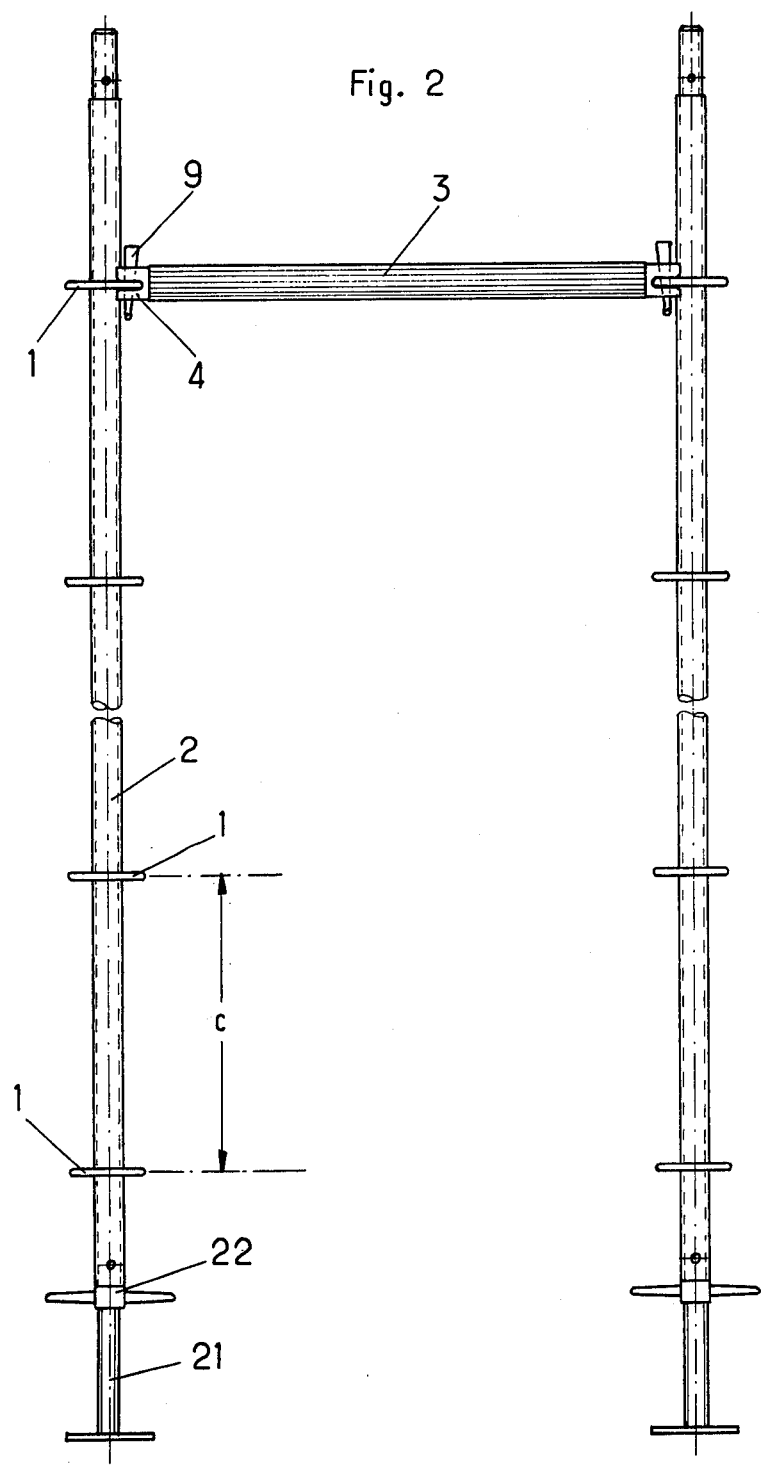
FIG. 2 is a diagrammatic side view showing two upright elements connected by a bracing element.

FIG. 2 shows two uprights 2 which are provided at vertically spaced locations with ring flanges 1 of the type shown in FIGS. 1a and 1b. Advantageously, these ring flanges are welded to the uprights 2 but could be connected thereto in other ways, as mentioned before, for example, by screw threaded connections or the like. The lower ends of the uprights 2 are provided with spindles 21 which can be downwardly extended or upwardly retracted relative to the uprights 2 by means of wing nuts 22, so as to accommodate the length of the uprights 2 to different surface levels. The spacing c between axially consecutive ones of the ring flanges 1 is so selected that the distance between successive vertical bracing elements 3 — which is usually standardized — is a whole number multiple of the distance c.

The ends of the bracing elements 3 are provided with axially open slots and with openings which extend normal to the elongation of these slots. The slots and the openings can be provided in the end portions of the tubular bracing elements. However, it has been found advantageous if connecting shoes or mounting shoes are inserted into the open ends of the bracing elements 3.

Figure 4:
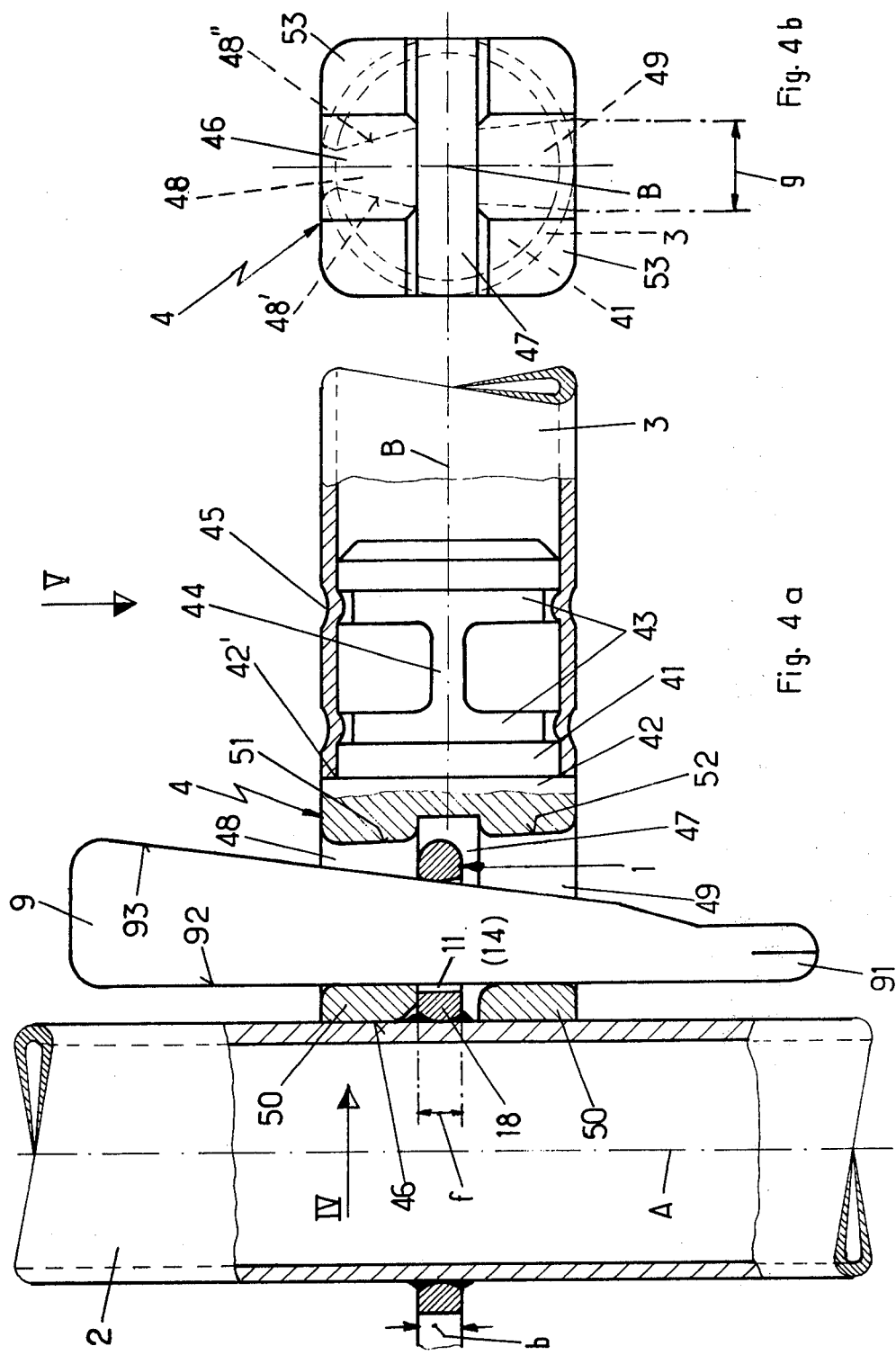
FIG. 4a is a fragmentary vertical section through the connection between an upright element and a horizontal bracing element.
FIG. 4b is a view of FIG. 4a, seen in the direction of the arrow IV thereof.

FIG. 4a shows this possibility and illustrates that the mounting shoe 4 inserted into the open end of the bracing element 3 has a cylindrical portion 41 whose outer diameter corresponds to the inner diameter of the tubular bracing element 3. The cylindrical portion 41 is provided with a plurality of grooves in its outer circumferential surface, for example two circumferentially extending grooves 43 and a plurality of axially extending grooves 44 connecting the grooves 43. The cylindrical portion 41 is inserted into the open end of the tubular bracing element 3 so that a shoulder 42' which adjoins the outer part 42 abuts the bracing element 3, whereupon the wall of the bracing element 3 is deformed to provide inwardly extending beads or projections 45 which extend into the grooves 43 and 44 and thus fixedly connect the respective shoe 4 to the bracing element 3. The free end face 46 of the shoe 4 is so curved cylindrically that it is accommodated to the curved contour of the outer circumferential surface of the respective upright element 2, as is also evident from FIG. 5.

The portion 42 of the shoe 4 which is of substantially rectangular cross-section in the illustrated embodiment, is formed with a slot 47 which extends inwardly of it from the free end face 46 in axial direction of the bracing element 3 and whose width f is greater than the axial thickness b of the ring flanges 1. The cross-sections into which the portion 42 is subdivided by the slot 47 are formed with openings extending transverse to the elongation of the slot 47, namely with the opening 48 in the section which in the installed condition faces upwardly and with the opening 49 in the section which in the installed condition faces downwardly. The two openings 48 and 49 are each of rectangular cross-section in the illustrated embodiment. The opening 49 has a relatively large width g whereas the opening 48 converges substantially in upward direction, in that its lateral boundary faces 48' and 48" are inclined towards one another in upward direction, as evident from FIG. 4b. The wedge member 9, whose lower end portion 91 may be either upset or else slotted as shown and then bent apart, or which may be provided with an appropriate rivet or the like, is thus prevented from passing through the narrow part of the upper opening 48, so that it can be withdrawn across the slot 47 to permit insertion or removal of a ring flange 1 but cannot become completely disconnected from the respective bracing element 3.

The dimensions of the openings 48 and 49 are so selected that the walls 50 bounding these openings adjacent the end face 46 are of greater thickness than the thickness h of the walls 18 bounding the cut-outs 11 and 14 of the ring flange 1 on the side of the cut-out facing towards the upright element 2. On the other hand, the longitudinal dimension of the openings 48 and 49, i.e., the dimension in direction of the longitudinal axis B of the bracing element 3, is so selected that the inner walls 51 and 52 are spaced — after the insertion of the shoe 4 — substantially farther from the outer surface of the wall of the upright element 2 than the inner surface 12 or 16 of the cut-outs 11 and 14 of the respective ring flange 1.

If a connection is to be established between a horizontal bracing element 3 and an upright element 2, then the shoe 4 of the bracing element 3 is pushed onto the appropriate ring flange 1 so that the latter enters into the slot 47 and the openings 48 and 49 move into communication with one of the cut-outs 11 or 14, as the case may be. During this insertion the wedge member 9 is pulled up far enough so that it does not extend across the slot 47 and does not hinder the insertion. As soon as the flange member 1 and the bracing element 3 are in the desired relative position, the wedge member 9 is pushed downwardly and is then wedged in place by hammering or the like, so that its surface 92 becomes firmly wedged against the inner surfaces of the wall 50 of the shoe whereas its inclined face 93 is pressed against the inner face 12 or 16 of the respective cut-out 11 or 14. This causes the free end face 46 of the shoe 4 to be pressed firmly against the outer surface of the wall of the upright element 2.

FIG. 4b is a view of the end face of the shoe 4 in the direction of the arrow IV in FIG. 4a. The end face 49 is curved suitably and thus is accommodated to the curved contour of the outer surface of the wall bounding the element 2. The side faces 53 are inclined in the manner shown in FIG. 5. Thus, for example, two horizontally extending bracing elements which are inclined at a certain acute angle relative to one another can be connected to a ring flange 1, in such a manner that one of the bracing elements 3 is secured at one of the cut-outs 11 and the other bracing element 3 is secured at a directly adjacent cut-out 14. Also shown in FIG. 4b is the fact that the upper opening 48 of the shoe 4 converges in upward direction and thus prevents the withdrawal of the wedge member 9.

Figure 5:
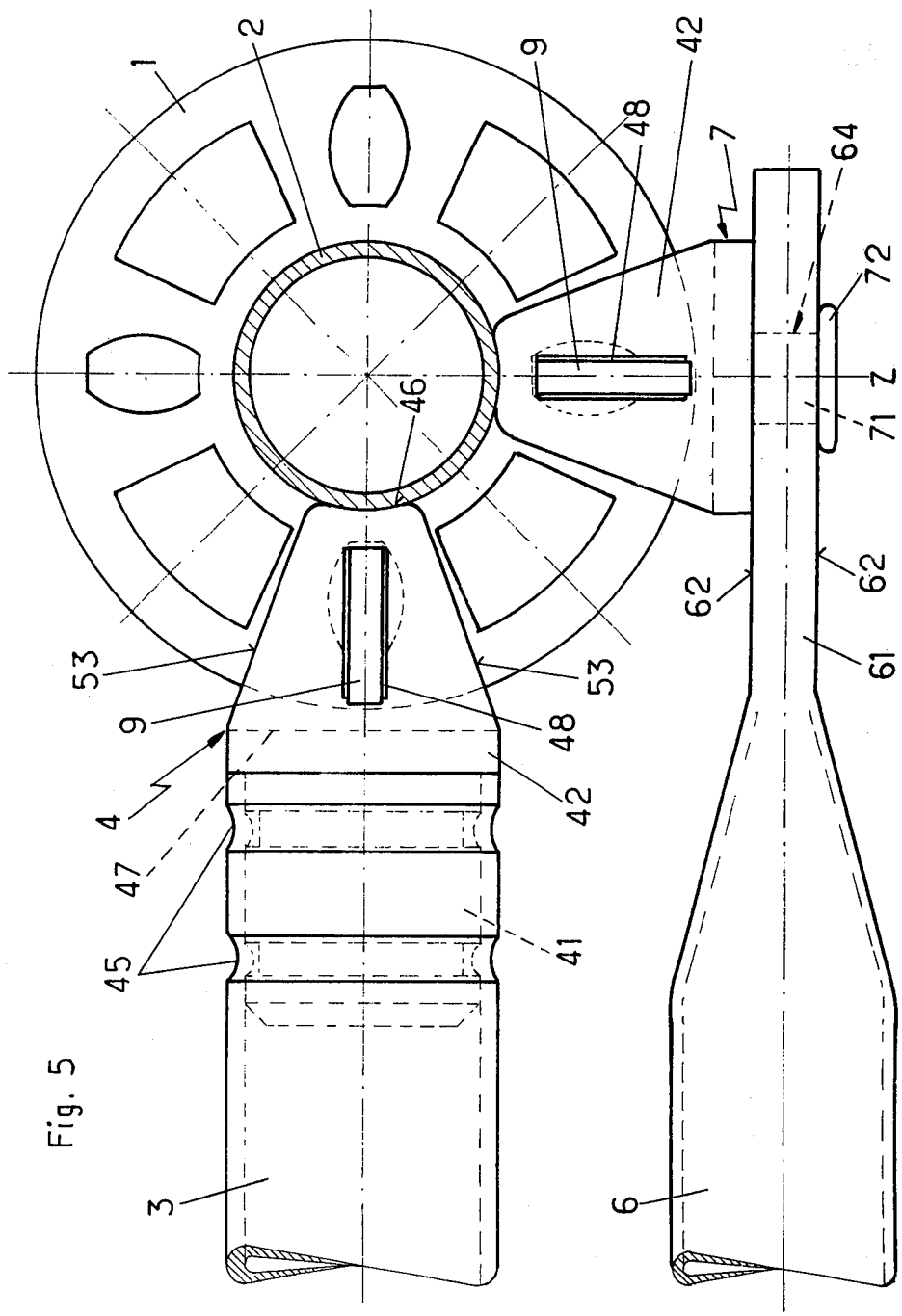
FIG. 5 is a view of FIG. 4a, seen in the direction of the arrow V thereof.

FIG. 5 shows in a top plan view the connection between a horizontal bracing element 3 and an upright element 2, this view being the one indicated in FIG. 4a by the arrow V. In addition, FIG. 5 shows the connection of a diagonally inclined bracing element 6 which is provided with a mounting shoe 7. The mounting shoe 7 also is provided with a slot corresponding to the slot 47 and with openings extending transverse to the elongation of the slot. The parts 42 of the mounting shoe 4 and 7 thus are identical with one another. However, the manner in which the mounting shoe 7 is connected to the bracing element 6 differs from the manner in which the mounting shoe 4 is connected to the bracing element 3.

The bracing element 6 may be tubular and its ends are formed, for example, by pressing them together, so that they are configurated as lugs 61 bounded by two parallel planar surfaces 62. The lug 61 is provided with a bore 64 in which a cylindrical portion 71 of the part 42 of the shoe 7 is received, being prevented from undesired withdrawal by provision of a rivet 72 or another connection, for example a screw connection. The rivet 72 or analogous connection must be such that the part 42 can turn about the longitudinal axis z of the pin 71 and the bore 64.

The connection of the shoe 72 to the ring flange 1 is carried out in the same manner as described above with respect to the shoe 4, and the fact that the bracing element 6 can then be pivoted about the axis z relative to the shoe 7 makes it possible thereafter to move the bracing element 6 to any desired diagonal orientation, in correspondence with the particular requirements of a scaffolding being erected.

Figure 3:
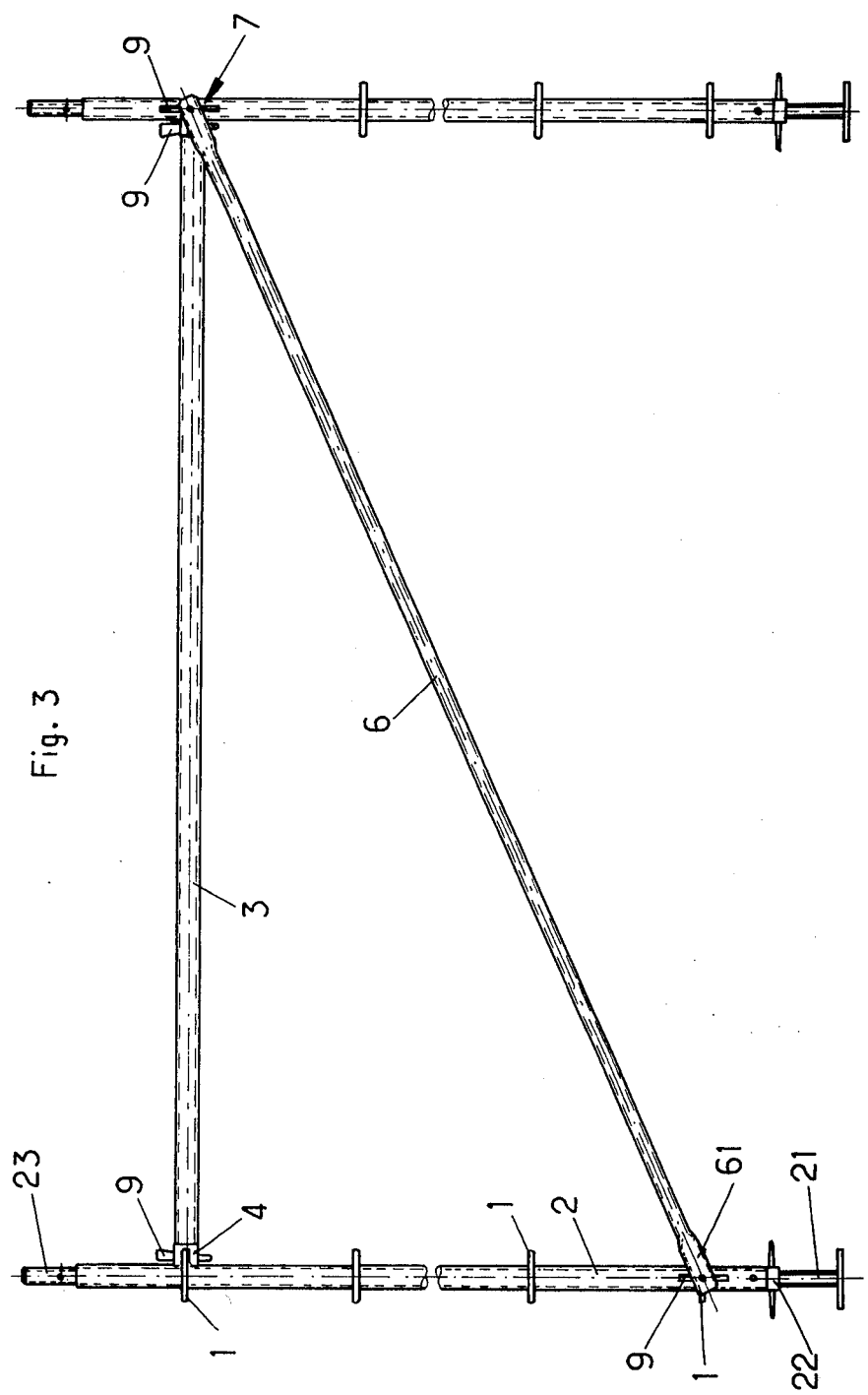
FIG. 3 is an another diagrammatic side view, showing two upright elements connected by two bracing elements.

FIG. 3 is a side view of a portion of the scaffolding of the present invention, having two uprights 2, a horizontal bracing element 3 and a diagonal or inclined bracing element 6. The shoes 4 of the horizontal bracing element 3 are connected to respective ring flanges 1 of the upright element 2 via cutouts 11 thereof. A shoe 7 of the bracing element 6 is connected to the uppermost ring flange 1 of the right-hand upright element 2, namely to the cutout 11 of this ring flange 1 which extends at a right angle to the one to which the shoe 4 of the bracing element 3 is connected. The shoe 7 at the other end of the bracing element 3 is connected to another flange 1, in this case the lowest one, of the other upright element 2 in the same manner as described before.

It is advantageous if the upright elements 2 and the diagonal bracing elements 6 are tubes of circular cross-section, and if the upper ends of the upright elements 2 are provided with bolts 23 serving to provide a connection with another axially aligned upright element 2, if and when required. The horizontal bracing element 3 may be tubular, or may be profiled of U-shaped cross-section, depending upon the weight to be carried by the scaffolding and other considerations. For example, in FIG. 2 the horizontal bracing element 3 is of U-shaped cross-section to which other elements (not shown) can be connected by providing claws or hooks on them that can be hooked onto the bracing element 3.

The ring flanges 1 may be made by stamping, or they may be made by casting, either by regular casting or by pressure casting. It is advantageous if they are welded to the upright elements 2, but they can also be secured to them in other ways, for example by means of rivet connections, screw connections or the like. In the latter case, the ring flange 1 may be advantageously provided with a short tubular hub whose inner diameter corresponds to the inner diameter of the ring flange 1 and which can be used for threadingly connecting the ring flange 1 to the upright element 2. In fact, such a hub can also be used for establishing a rivet connection to the upright element 2.

The particular embodiments shown for the shoes 4 and 7 are, of course, exemplary only. Other embodiments can be readily envisioned. In particular, it is of course possible to configurate the end portion of the tubular horizontal bracing element 3 in itself with the slot and the openings extending transverse to the slot, by forming these in the circumferential wall of the bracing element 3. The shoes 4 and 7 need also not be of substantially rectangular cross-section, but could be of cylindrical or for example frustoconical configuration. Instead of inserting a cylindrical portion 41 of the shoe 4 into the tubular bracing element 3 and retaining them by means of the projections 45, the connection could also be established by means of a rivet connection, a welded connection or a screw connection or the like.

It will be understood that each of the elements described above, or two or more together, may also find a useful application in other types of constructions differing from the types described above.

While the invention has been illustrated and described as embodied in a frame structure, particularly a scaffolding, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A frame structure, particularly a scaffolding, comprising a plurality of tubular upright elements each having an upright axis and an outer surface; a plurality of bracing elements each having two elongated end portions each of which has a longitudinal slot of a predetermined width and subdividing the respective end portion into two sections which have registering openings extending substantially normal to the elongation of the respective end portion; means for connecting at least some of said bracing elements to said upright elements to obtain a basic rectangular grid of said bracing elements, including a number of circumferentially complete ring flanges so supported on each of said upright elements as to circumferentially embrace the same with axial spacing from one another and each having a thickness at most equal to said width of said slot so as to be receivable therein so that said sections of the respective end portion straddle said flange, a plurality of first cut-outs extending through the respective flange and having respective radial axes located in a common plane normal to said upright axis and which intersect at the latter and are normal to each other in said plane, and a plurality of wedge members each receivable in said registering openings of the respective end portion to extend across said slot thereof and through one of said first cut-outs, the latter being of substantially barrel-shaped configurations so that a partly advanced wedge member is receivable therein even when the elongation of said respective end portion deviates from the respective radial axis, while further advancement of said wedge member results in alignment of said elongation with said respective radial axis; means for connecting other bracing elements to said flanges for each of said other bracing elements to extend from the respective flange in a direction different from those of said radial axes, including a plurality of second cut-outs extending through the respective flange intermediate said first cut-outs and being of such shapes that a respective one of said wedges can be received therein in the fully advanced position thereof even when the elongation of said end portion of the respective other bracing element is located in a plane deviating from the radial direction of said flange; and means for at least suppressing shearing stresses in the zone of juxtaposition of said flange with said upright element by transmitting loading forces acting on the respective bracing element parallel to said upright axis of the respective upright element from the respective end portion of the respective bracing element directly to the respective upright element, including respective endfaces on said sections of said end portions of at least said some bracing elements, said endfaces being of mating configurations to said outer surface of the respective upright element so that the respective wedge member in the advanced position thereof presses said endfaces into frictional contact with said outer surface with a force resulting in a frictional force between said endfaces and said outer surface which opposes and compensates for said loading forces, whereas said wedge member simultaneously subjects said flange to a counterforce opposite to said force and transmitted through said circumferentially complete flange to act on a region of said outer surface which is diametrally opposite to the region of application of said force.

2. A frame structure as defined in claim 1, wherein said bracing elements extend horizontally with reference to the respective upright elements which they connect.

3. A frame structure as defined in claim 1, wherein said bracing elements extend diagonally with reference to the respective upright elements which they connect.

4. A frame structure as defined in claim 1, wherein four of the cut-outs in the respective flanges are substantially barrel-shaped and so arranged that their respective major axes intersect at right angles in the longitudinal axis of the associated upright element.

5. A frame structure as defined in claim 1, wherein each of said end portions includes an insert of non-tubular cross-section formed with said slot and said openings.

6. A frame structure as defined in claim 5, wherein each insert is provided with a cylindrical extension received in an open end of the respective bracing element and secured therein.

7. A frame structure as defined in claim 6, said cylindrical extension having an external surface formed with circumferential and axial grooves, and the associated bracing element being formed with inwardly extending projections which are received in the respective grooves.

8. A frame structure as defined in claim 1, wherein each of said end portions is formed with a lug, a mounting part formed with said slot and openings, and a pin turnably connecting said mounting part to said lug.

9. A frame structure as defined in claim 1; further comprising means connecting each wedge member movably but irremovably to one of said end portions so that the wedge member may be withdrawn from said openings by a distance sufficient to permit entry and removal of one of said flanges from the slot of the respective end portion.

10. A frame structure as defined in claim 1, each of said second cut-out having in radial direction of the respective flange a dimension corresponding to the dimension of the first cut-out in the same direction, but having in circumferential direction of the respective flange a dimension which is a multiple of the corresponding dimension of said first cut-outs, said dimensions being taken at the same radius in both instances.

11. A frame structure as defined in claim 1, wherein said sections of said end portion have side faces which converge in direction toward said endfaces.

* * * * *